United States Patent [19]

Schminke

[11] 4,080,183
[45] Mar. 21, 1978

[54] RADIAL FLOW SCRUBBER

[75] Inventor: Heinz Schminke, Egelsbach, Germany

[73] Assignee: Metallgesellschaft Aktiengesellschaft, Frankfurt am Main, Germany

[21] Appl. No.: 669,847

[22] Filed: Mar. 24, 1976

[30] Foreign Application Priority Data

Apr. 8, 1975 Germany .............. 2515140

[51] Int. Cl.$^2$ ........................... B01D 47/00
[52] U.S. Cl. ........................... 55/226; 92/44; 261/DIG. 54
[58] Field of Search .............. 261/62, DIG. 54; 55/212, 213, 226, 240, 241; 137/375; 251/61.2; 138/46; 92/44, 34

[56] References Cited

U.S. PATENT DOCUMENTS

| | | | |
|---|---|---|---|
| 1,624,348 | 4/1927 | Mallory | 251/61.2 |
| 3,075,542 | 1/1963 | Diesing | 92/44 |
| 3,113,168 | 12/1963 | Kinney | 261/DIG. 54 |
| 3,315,700 | 4/1967 | Greenwood | 137/375 |
| 3,343,341 | 9/1967 | Wiemer | 261/118 |
| 3,350,076 | 10/1967 | Grommelin | 138/46 |
| 3,406,499 | 10/1968 | Wiemer | 211/DIG. 54 |
| 3,834,127 | 9/1974 | VonJordon et al. | 55/226 |
| 3,844,745 | 10/1974 | Hausberg et al. | 261/DIG. 54 |

*Primary Examiner*—Bernard Nozick
*Attorney, Agent, or Firm*—Karl F. Ross

[57] ABSTRACT

A radial-flow scrubber in which a gas is passed downwardly through an annular gap after having been treated with a liquid in which the gap is adjusted by a ring disposed below the orifice for the gas/liquid mixture and shiftable toward and away from the latter on one end of a fluid-containing diaphragm, especially a metal bellows. The fluid pressure in the bellows may be maintained at atmospheric levels or may be adjusted by sealing the bellows or feeding fluid under pressure thereto. Advantageously the pressure within the bellows, to control the expansion or contraction thereof is a function of the pressure of the liquid/gas mixture or its flow velocity.

2 Claims, 3 Drawing Figures

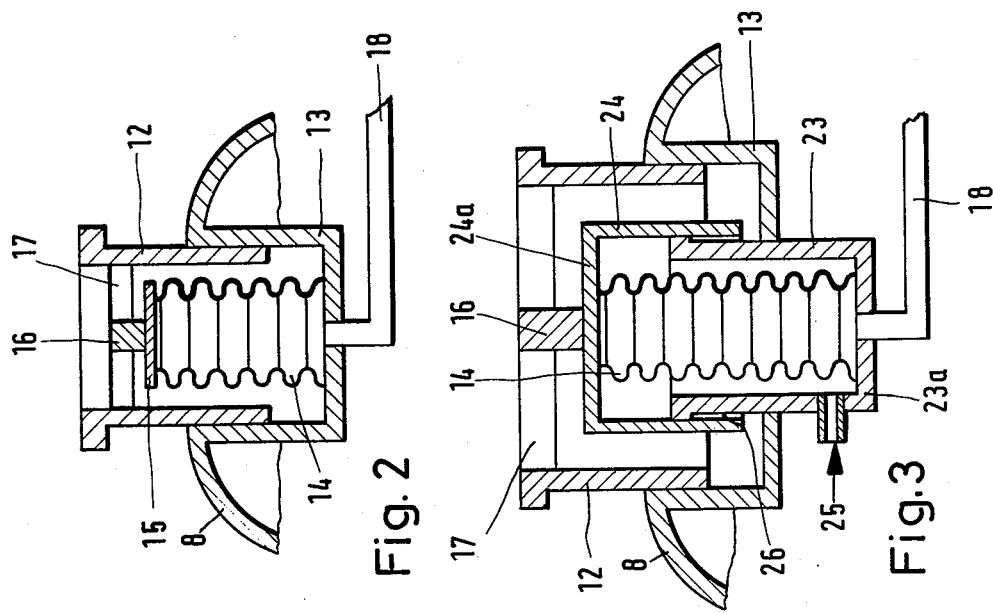
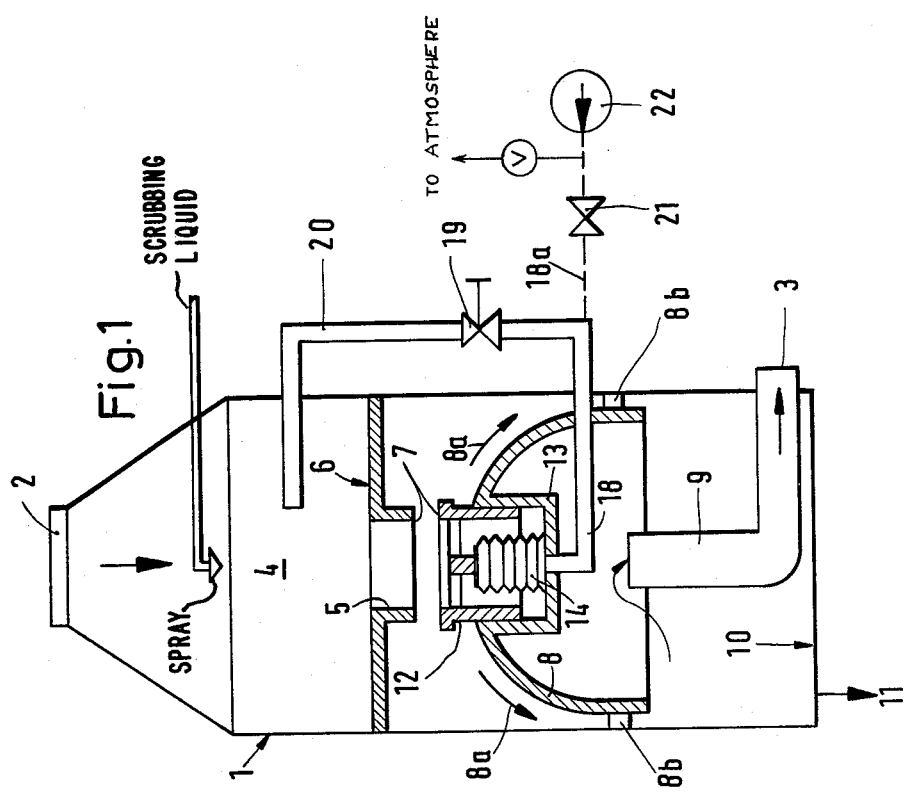

RADIAL FLOW SCRUBBER

FIELD OF THE INVENTION

This invention relates to a radial-flow scrubber having a gas-inlet region which is on a higher pressure level, at least one gas-flow gap, which is variable in width by an adjustment of an adjustable member, and a gas-outlet region which is at a lower pressure level than the gas-inlet region.

BACKGROUND OF THE INVENTION

Single-stage or multi-stage radial-flow scrubbers or coolers are known, e.g., from German Patent Specification 1,241,804; 2,546,674; 1,259,361; and 2,224,519. It is known to adjust the gas flow gap of these scrubbers by lifting means, which are preferably driven by electric motors and actuated by mechanical transmissions. The lifting means are accommodated in a separate chamber or tunnel and actuate the adjustable member by means of a linkage. Hydraulic or pneumatic actuators are also known for this purpose and mechanical linkages comprising levers or eccentrics have also been used.

All these designs have the disadvantage that the movable structured elements, such as shafts, rods, levers, pistons, push rods, etc. which perform an axial or rotary motion, must be sealed against the supply pressure or against the differential pressure in the scrubber. Because these scrubbers are used to scrub solid or gaseous impurities from gases, the impurities result in a formation of crusts (e.g. of lime) or caked-on layers (e.g. of ask or salts) or bonding layers (e.g. of tar) so that the seals required for the known lifting means are destroyed rapidly and the scrubber must be repaired.

In numerous applications, seals of soft materials, such as rubber or teflon, cannot be used because they are destroyed by aggressive fluids. Specifically, the known scrubbers cannot be operated in a sufficiently trouble-free manner behind apparatus which serves for the gasification of coal under pressure and delivers product gases which contain tars, dust, and aggressive fluids.

OBJECT OF THE INVENTION

It is an object of the invention to provide the adjustable member or members in an improved scrubber in such a manner that a permanent operation without continual maintenance is enabled under the operating conditions described hereinafter.

SUMMARY OF THE INVENTION

This object is accomplished in that the adjustable member is movable by an elastically deformable diaphragm, which is controlled by pressure. The diaphragm consists of a bellows, which is suitably made of metal.

The diaphragm or bellows consists of a hollow body, which may be connected, e.g. by a pressure conduit, to a pressure source so that the adjustable member is displaced in response to a change of the internal pressure of the diaphragm.

Various means may be used as the pressure source required to deform the diaphragm. Any liquid or gaseous fluid can be delivered by a pump into the diaphragm or bellows.

Alternatively, the pressure source can consist of the gas-inlet region of the scrubber; the pressure in this region is higher than in the various other zones of the scrubber. In this case there is no need for a pump. For instance, in the scrubbing of gas produced by a pressure gasification of coal, the pressure in the gas-inlet region is about 10-100 bars.

In another alternative the hollow body can be so designed that owing to its inherent elasticity it adjusts itself in the desired manner in response to the pressure applied thereto. In this case there is no need for an additional external control pressure.

BRIEF DESCRIPTION OF THE DRAWING

In the drawing:

FIG. 1 is a simplified longitudinal sectional view showing a radial-flow scrubber embodying the invention;

FIG. 2 is an enlarged longitudinal sectional view showing the lifting means of the radial-flow scrubber shown in FIG. 2; and FIG. 3 is a longitudinal sectional view showing a second embodiment of the lifting device.

SPECIFIC DESCRIPTION

The radial-flow scrubber of FIG. 1 may be used also as a cooler and comprises a housing 1, which has a gas-inlet opening 2 and a gas outlet 3.

The gas which is to be purified and or cooled flows first through the opening 2 into a gas-inlet region 4, in which it is sprayed with water in a manner not shown. The gas leaves the inlet region 4 through the opening defined in a partition 6 by a ring 5 and flows through a gap 7 with a pressure loss.

A substantial part of the impurities of the gas has now been taken up by the sprayed water. The gas is first guided downwardly in the direction of arrow 8a above a bell-shaped guide 8 and leaves the scrubber through an exhaust pipe 9. The sprayed water laden with the impurities collects over a bottom 10 of the scrubber and is withdrawn through conduit 11. The bell 8 is secured to the housing 1 by webs 8b.

To ensure the desired purification, the width of the gap 7 must be properly adjusted. This is accomplished by lifting means, details of which are shown in FIG. 2 on a larger scale. The width of the gap 7 is determined by an adjustable ring 12, which is movable up and down in a pot-shaped recess or well 13 sunk into the top of the bell 7. The adjustable ring 12 is moved by an elastic deformation of a bellows diaphragm. In the present example, the diaphragm consists of a metal bellows 14. The bellows 14 is firmly connected at its lower end to the bottom of the recess 13 and at its upper end carries a cover 15, from which a hub 16 extends. The adjustable ring 12 is connected to the bellows 14 by a plurality of spokes 17 between the hub 16 and the adjustable ring 12.

Access to the interior of the bellows 14 is established by a pressure conduit 18, through which liquid or gaseous fluid can be conducted from the outside into the bellows or withdrawn from the latter. In the embodiment shown in FIG. 1 the pressure conduit 18 leads to a regulating valve 19, from which a conduit 20 leads into the gas-inlet region 4. In this arrangement, the pressure applied to the interior of the bellows 14 may be increased up to the pressure in the gas-inlet region 4. The pressure in the interior of the bellows 14 is adjusted by means of the regulating valve 19.

In the embodiment shown in FIG. 1, the bellows is suitably designed and adjusted so that the co-action of its restoring force, which opposes the elastic deformation, and the smallest possible pressure difference between the gas-inlet region and the interior of the bellows results in the smallest width of the gas flow gap 7. When the valve 19 is so adjusted that the pressure in the interior of the bellows 14 is lower than the highest possible pressure, the external pressure will compress the elastically deformable bellows so that the gap 7 is opened further.

When it is desired to control the bellows 14 by an extraneous or liquid fluid rather than by the gas in the scrubber, a conduit 18a, shown in dotted lines, may be used which leads through a shut-off valve 21 to a pump 22. The pump 22 serves now as a pressure source, and the extraneous pressure fluid is conducted through the valve 21 and the conduits 18a and 18 into the bellows 14 under the desired pressure.

The embodiment shown in FIG. 3 may be used if the fluids or impurities contained in the gas supplied to the scrubber are so aggressive that it is desirable to protect the outside of the bellows 14 from the gas. In this case the bellows 14 is mounted in a movable capsule, which consists of the lower tube 23, which is provided with a bottom 23a, through which the pressure conduit extends. An upper tube 24 provided with a cover 24a is telescopically fitted on the lower tube 23 and slidable thereon. The bellows 14 is connected to the bottom 23a and the cover 24a. The lower tube 23 is welded to the bottom of the recess 13. To eliminate also the need for seals between the lower and upper tubes, a liquid or gaseous protecting fluid, such as water, is conducted from the outside through conduit 25 into the space between the two tubes and the bellows 14. This protective fluid may be supplied under a pressure which is much higher than the pressure prevailing outside the upper tube 24 so that this protective fluid is continuously bled at a low rate through the annular gap 26 between the upper and lower tubes and prevents an ingress of aggressive substances. As in FIG. 2, the bellows 14 in FIG. 3 is connected to the adjustable ring 12 by the hub 16 and spokes 17.

Alternatively, a simplified embodiment of the lifting means may be used in which a pressure control that is independent of the pressure in the scrubber is eliminated. This will be enabled if the bellows is filled with gas, such as air, and consists of a completely enclosed hollow body. In this case there is no pressure conduit 18 and the width of the gap 7 is mainly controlled by the inherent elasticity of the bellows and the restoring forces which oppose its deformation. A contribution to the restoring forces is provided by the gas volume enclosed in the bellows. In this embodiment the width of the gap can be adjusted only in a restricted range because an increase of the external gas pressure will necessarily compress the bellows further so that the gap 7 is enlarged. When gas is trapped in the bellows and both valves 19 and 21 are closed a similar result is attained.

The pressure-displacement characteristics of this simplified embodiment will be modified to some extent if the bellows is not closed and its interior is connected by a conduit 18 to the atmosphere which exists outside the scrubber housing 1. In this case the conduit 18 serves only to supply air to and to withdraw air from the interior of the bellows so that the pressure of the ambient air always prevails therein, and there will be no adjustment of the bellows in response to changes of the gas volume in its interior.

Lifting means of the kind described are highly desirable for radial-flow scrubbers which are supplied with gas produced by the pressure gasification of coal. This product gas is supplied into the scrubber under a high pressure of about 10–100 bars and contains a large quantity of aggressive substances.

I claim:

1. A radial-flow scrubber comprising:
   a housing formed with an inlet for the gas to be scrubbed, a gas-inlet region downstream of said inlet, a gas-outlet region downstream of said gas-inlet region and a gas outlet for the scrubbed gas connected to said gas-outlet region, the gas pressure in said gas-inlet region being higher than that in said gas-outlet region;
   spray means for washing liquid in said gas inlet region;
   a partition for separating said regions, said partition being formed with an opening for the gas and washing liquid;
   a guide means for the gas and washing liquid;
   a displaceable member between said guide means and said opening to define an annular gap of variable width with said partition;
   adjustment means consisting of a metal bellows for displacing said member, said displaceable member being connected to said metal bellows, said metal bellows being fluid-filled and having a pair of opposing relative displaceable walls whose relative position is a function of the pressure differential across said walls; and
   conduit means communicating between the inside of said metal bellows and said gas inlet region for varying the fluid pressure in said metal bellows, the restoring force of the bellows opposing elastic deformation thereof and the smallest pressure difference between said gas-inlet region and said compartment position said member for the smallest width of said gap.

2. The scrubber defined in claim 1 wherein a pump disposed externally of said housing is also connected to said conduit means.

* * * * *